UNITED STATES PATENT OFFICE.

EDUARD KOPETSCHNI, OF MANNHEIM, GERMANY, LADISLAUS KARCZAG, OF SZOLNOK, AUSTRIA-HUNGARY, AND OTTO FODOR, OF BERLIN, GERMANY; SAID FODOR ASSIGNOR TO PAUL KARCZAG, OF SZOLNOK, AUSTRIA-HUNGARY.

ANHYDRID OF SALICYLIC ACID AND PROCESS OF PREPARING THE SAME.

1,075,581.
No Drawing.

Specification of Letters Patent. Patented Oct. 14, 1913.

Application filed April 8, 1913. Serial No. 759,797.

*To all whom it may concern:*

Be it known that we, EDUARD KOPETSCHNI, analytical chemist, of 40 Kaiserring, Mannheim, Germany, LADISLAUS KARCZAG, analytical chemist, of Szolnok, Austria-Hungary, and OTTO FODOR, analytical chemist, of 12 Bundesratsufer, Berlin, Germany, have invented a certain new and useful Anhydrid of Salicylic Acid and Process of Preparing the Same; and we do hereby declare the following to be a full, clear, and exact description of the invention, such as will enable others skilled in the art to which it appertains to make and use the same.

The compounds described in literature as salicylids are partly the anhydrids formed from 2 molecules of salicylic acid by eliminating the water and partly the polymers thereof and such as are of unknown constitution. To the first-named group belong the tetrasalicylid of Anschiltz (*Berichte* 25, 1892, page 2511; *Annalen* 273, 1893, page 94) as well as the disalicylid of Einhorn (*Berichte* 34, 1901, page 2951); to the latter group belong the polysalicylid as well as a salicylid prepared by heating acetyl salicylid for 5 to 6 hours at 200° to 210° (*cf.* German Patent No. 134,234).

It has now been found that the salicylic acid chlorid

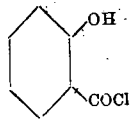

obtainable by the action of thionyl chlorid on the monoalkali and dialkali salts of salicylic acid according to the method described in application for U. S. patent, filed September 5th, 1912, Serial No. 718,643, readily gives up a molecule of hydrochloric acid forming a body which is characterized by its properties being like those of an anhydrid-like compound, but which however differs considerably from hitherto known salicylids in its reactions. Probably this compound is to be regarded as the long-sought simple salicylid of the formula:

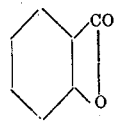

which is probably formed by eliminating the water from only one molecule of salicylic acid. Owing to the ring being readily split, such a compound may be expected to possess a large reaction capacity, which it in fact really has.

Example 1: With regard to the formation of this compound, it is effected by heating salicylic acid chlorid by itself *in vacuo*, hydrochloric acid being then separated. This reaction however takes place very slowly. It has been found more suitable to treat the salicylic acid chlorid with reagents adapted to separate hydrochloric acid, as *e. g.* alkaline carbonates.

Example 2: Salicylic acid chlorid is mixed with the estimated quantity of calcium carbonate and heated to about 50°–70°. The reaction product so obtained is extracted with plenty of warm water, the newly formed body being separated as an oily mass which, when cooled, immediately solidifies and can then be easily pulverized.

The separation of the hydrochloric acid takes place more smoothly with the aid of tertiary bases, as *e. g.* pyridin and diethyl anilin.

Example 3: 5 parts salicylic acid chlorid are added drop by drop to 25 parts pyridin which is kept cool in the meantime, the reaction then taking place with separation of the chlorid of pyridin. After standing for 2 hours dilute hydrochloric acid is added; the salicylid which has formed separates as a white mass which is freed of any pyridin adhering thereto by repeated extraction with warm dilute hydrochloric acid, and is finally extracted with a very dilute heated solution of soda for separating any salicylic acid which may still be present. The salicylid so obtained is very readily soluble in ether, acetone, glacial acetic acid, ethyl acetate and benzol, is less readily soluble in alcohol, and is soluble with difficulty in ligroin. When heated with a solution of caustic potash it at once yields potassium salicylid, when heated with alcoholic potash there is formed in addition to the potassium salt of salicylic acid, a salicylic acid ethyl ether.

If the salicylid is heated for five minutes with anilin at the boiling point, the ring is split up and it is converted into salicylanilid. By the above reaction this salicylid is to be distinguished from Anschiltz's tetrasalicylid which yields in the same time no salicylanilid, or at least no quantity of the same worth mentioning. When heated at the boiling point with alcohol it yields salicylic acid ethyl ester, whereas the tetrasalicylid and polysalicylid yield the same only when heated in the pressure tube (*Berichte* 25, 1892, page 3511).

The new compound is most clearly distinguishable from the disalicylid, tetrasalicylid and polysalicylid in its behavior toward ammonia. When treated with this it assumes a yellow color in the cold, there being formed the salicyl-amid and the hitherto unknown disalicyl imid.

(white needles having a melting point of 215°), whereas the known salicylid has no reaction with ammonia in the cold.

The new compound is distinguishable from the salicylid of German Patent No. 134,234, which melts between 130° and 210°, by its lower melting point which lies between 90° and 100° (after previous sintering), as well as by its ready solubility in ether.

Salicylo-salicylic acid which is obtainable, according to the process of German Patent No. 211,403, by the successive action of agents which form acid chlorids and separate hydrochloric acid upon salicylic acid, and which has the formula

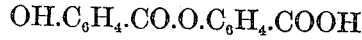

and melts at 147° to 148°, differs from the product of the present process in its insolubility in dilute aqueous solutions of alkalis. When acted on for a somewhat long time by such dilute solutions, or when more quickly acted on by stronger alkaline solutions, it is dissolved but simultaneously decomposed under formation of salicylic acid. Moreover, whereas salicylo-salicylic acid is soluble in ether and benzol with difficulty, the new salicylid is readily absorbed by these solvents even in the cold. When the solvent is evaporated, it remains behind as a syrupy mass and is not to be so obtained in crystalline form. When mixed with ferric chlorid in an alcoholic solution, it does not give the characteristic violet salicyl reaction, but a red precipitate is then formed.

In view of its reaction capacity, the above described salicylid is intended to be employed not only as a starting material for producing other salicylic acid derivatives, but also as a therapeutic agent in itself.

We claim:

1. The process of producing an anhydrid of salicylic acid, consisting in subjecting salicylic acid chlorid to treatment to split off therefrom hydrochloric acid.

2. The process of producing an anhydrid of salicylic acid, which consists in treating salicylic acid chlorid with re-agents reacting therewith to split off therefrom hydrochloric acid and separating the anhydrid formed.

3. The herein described product consisting of an anhydrid of salicylic acid, the same being readily soluble in ether, acetone, glacial acetic acid, ethyl acetate, benzol, melting between 90° and 100°, and converted by boiling with anilin into salicylanilid.

In testimony whereof we affix our signatures, in presence of two witnesses.

EDUARD KOPETSCHNI.
LADISLAUS KARCZAG.
OTTO FODOR.

Witnesses as to Eduard Kopetschni's signature:
    JOSEPH PFEIFFER,
    LUISE SCHELLER.

Witnesses as to Ladislaus Karczag:
    ALICE VON BADINSKI,
    KARL MICHAËLIS.

Witnesses as to Otto Fodor:
    HENRY HASPER,
    WOLDEMAR HAUPT.